Sept. 4, 1962 P. D. WEST 3,052,149
CONNECTOR GUSSET FOR FRAMING CONSTRUCTION
Filed Feb. 24, 1958
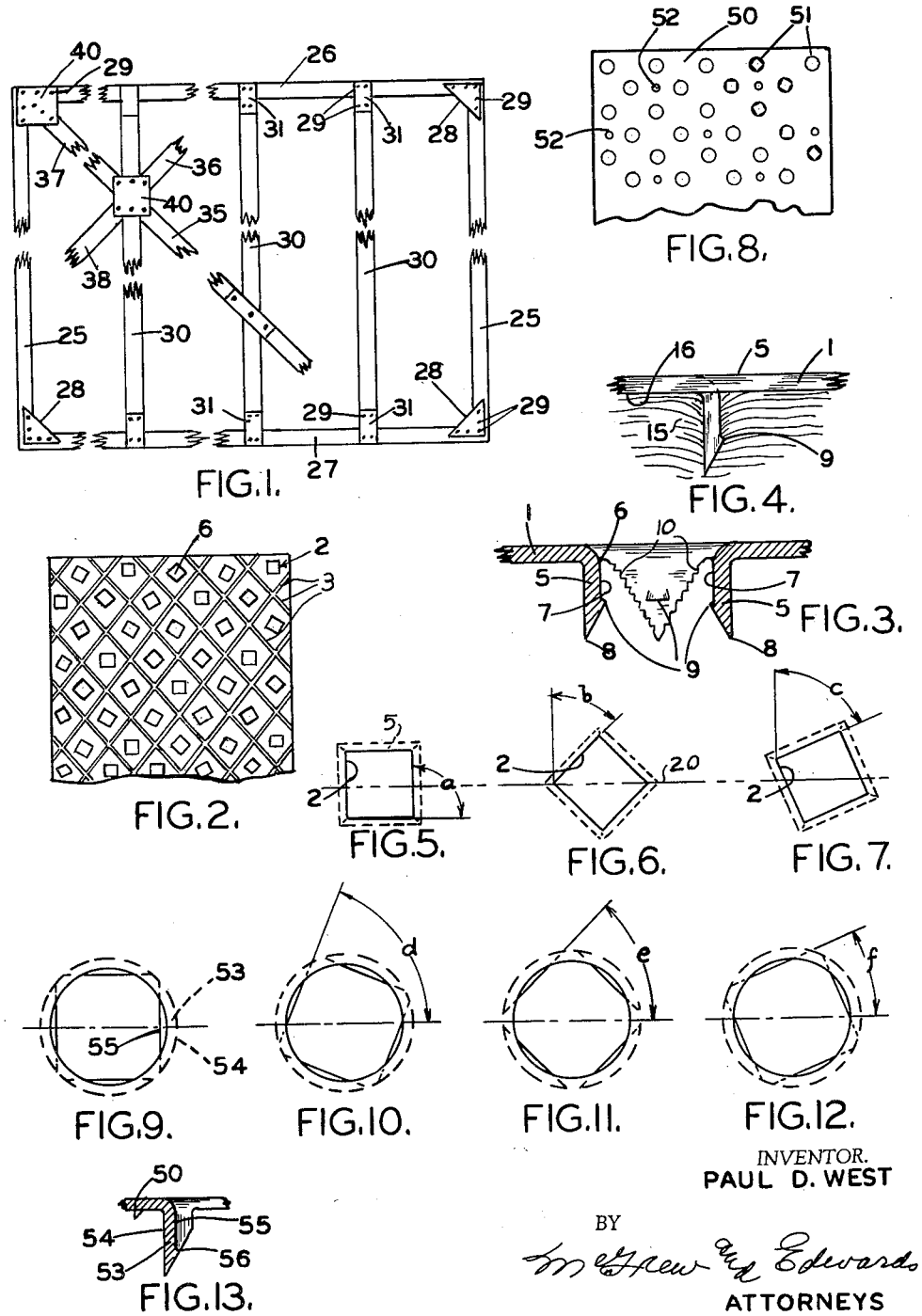
INVENTOR.
PAUL D. WEST
BY
McGrew and Edwards
ATTORNEYS

United States Patent Office 3,052,149
Patented Sept. 4, 1962

3,052,149
CONNECTOR GUSSET FOR FRAMING
CONSTRUCTION
Paul D. West, Colorado Springs, Colo., assignor to Truss
Pre-Fab, Inc., Colorado Springs, Colo., a corporation
of Colorado
Filed Feb. 24, 1958, Ser. No. 717,080
3 Claims. (Cl. 85—13)

This invention relates to metal connector plates and gussets for connecting wooden structural members together, and particularly relates to metal connector plates having a plurality of punched out teeth which are forced into adjoining members of wooden framing structures for securingly joining such members together.

Wooden structural members are used in large quantities in all phases of the construction industry, particularly as framing members. Economical and low cost housing construction, as well as other types of construction, utilizes wooden framing for such components as walls, wall components, partitions, roof trusses, gable panels, and the like. The connection or joints of the wooden members of such framing structures are the critical points, and efficient connection is difficult to achieve in light weight structures where small sizes, usually two by fours, of wooden members are used. The wooden framing structures are load carrying members, and the joints of the wooden structural members generally are subjected to unfavorable stress distribution. Generally speaking, the relative effectiveness of the connectors used in making the joint must be determined according to a number of variables which includes the magnitude of the forces involved, the area available for the connectors, the size of the members being connected, the amount of deformation which might be tolerated, the ease and economy of making the connection, and the like. Nails have been the most commonly used of all fastening or connecting devices since they may be used without special preparation of the framing lumber and without any need of great accuracy or special tools for use. Two major disadvantages of nails are, however, the tendency to split the wood and to have the wood shrink away from the nails, limiting their holding grip in the wood. Bolts and plate connectors have been used in many instances, but again for light weight use they have not found any great market due mainly to economy and the fact that light weight construction simply cannot withstand the use of bolts which extend through the wood. The most commonly used connectors for light weight framing are metal-toothed plates, the teeth of which are pressed into the faces of the wood and nails or screws are used to hold the plates in position.

A well known connector consists of a thin metal plate having teeth punched out of the plate, and a single, arcuate tooth being punched out of a single hole. The teeth are uniformly spaced and uniformly faced in one direction so the wood fibers are not cut when the teeth are pressed in the wood. Such a plate requires a large number of nails to hold it in the wooden members, since the teeth contribute a reducing holding power as the wood shrinks on aging.

Walls and wall segments are especially difficult to design and manufacture due largely to the variety of loads that walls must carry, which includes compressive, uplift, lateral, bending and racking loads. Also, since a variety of sheathings for exterior and interior use are available, the support contributed by these sheathings is actually indeterminable for prefabricated systems. The joint connectors are very critical in wall framing, and the structural design is normally calculated on the unsheathed structural members. The transportation and handling of wall panel frames are critical, especially with nailed joints. The stresses and vibration caused by movement will loosen the nails resulting in failure of the panels. Thus, prefabricated wall frames have not had extensive use due to the lack of an adequate connector which permits the normal storage and transportation of unsheathed frame sections.

According to the present invention, I have provided an improved connector plate or gusset of increased strength and holding power, and requiring a reduced number of nails to hold the plates into the wood of a wooden framing structure. The plates and the gussets of the present invention are made of light weight metal from which a plurality of teeth or projections are punched from the plate, and a plurality of teeth are punched from a single hole. The teeth of each hole extend substantially around the periphery of the hole and all project in the same direction at substantially 90° to the plate. Each of the teeth of the plate is provided with a gripping hook for gripping the fibers of the wood. The peripheral arrangement of the teeth around each hole on the plate insures that a substantial amount of the wood fibers are cut when pressed into wood forming a core internally of the teeth. By having each set of teeth, that is the teeth around each hole, definitely cut a core, the cut wood fibers bear against both sides of each tooth increasing the holding power of the plate in the wood. The teeth, also, flower or spread out when pressed into the wood forming a clinching and holding effect which will withstand rough handling. The gusset provides a strong connector which is effective for the joints of framing structures such as walls, wall panels, trusses, and the like.

Included among the objects and advantages of the present invention, is to provide a metal connector gusset having a plurality of teeth or projections punched from the plate, and a plurality of teeth are punched forming a single hole and the teeth form an enclosure. The plate of the invention includes a hook on each tooth to provide holding power of the plate when pressed into a wooden member without the use of nails, and it provides maximum holding power with a minimum number of nails driven through the plate into the wooden members. The plate provides a strong and rigid connector which effectively joins wooden members of framing sections into a single plane system which is strong without sheathing or covering members on the frame. The plate or gusset provides a plurality of series of teeth in peripheral arrangement whereby the teeth of each series cut a substantial portion of the fibers when pressed into a wooden member forming a core, and the teeth flower in the wooden member increasing the holding force of the plate on the wooden member.

These and other objects and advantages of the invention may be readily ascertained by referring to the following description and appended illustrations in which:

FIG. 1 is a front elevation view of a single plane wall panel or wall framing section utilizing connecting gussets according to the invention;

FIG. 2 is a top plan view of a form of the gusset illustrating the positioning of the teeth throughout the extent of the plate;

FIG. 3 is an enlarged detailed, cross-sectional view of a series of teeth punched from a single gusset in extended position;

FIG. 4 is a schematic view of a tooth according to the invention imbedded in a wooden member illustrating the action of the fibers retaining a hook on the tooth;

FIGS. 5, 6 and 7 are schematic views of the arrangement of the teeth holes of the gusset of FIG. 2 illustrating the angular positioning of the peripheral series of teeth in relation to a plane passing centerwise through the holes;

FIG. 8 is a top plan view of a modified gusset according to the invention illustrating the positioning of teeth punch out holes and nail holes throughout the gusset;

FIGS. 9, 10, 11 and 12 a series of schematic views illustrating the rotation of the axes of a series of teeth about the center of the holes whereby a different penetration angle is achieved with adjacent series of teeth into a wooden member; and, FIG. 13 is a detailed view of a single tooth of a series in the modification of FIG. 8.

The gusset illustrated in FIGS. 2 through 7, inclusive, includes a body 1 which is preferably a light gauge metal, for instance twenty gauge mild steel, which may be coated with any resistant coating such as zinc, plastic and the like. From the plate are pushed a series of teeth 2, each series 2 including four teeth punched in a single hole in rectangular pattern. Small and elongated ribs or crimps 3 are criss-crossed about the plate encircling each tooth punch out hole to strengthen the plate areas between the holes. The elongated crimps or ribs 3 may extend in one direction, that is providing a series of substantially parallel ribs 3 from one corner to the opposite corner of the gusset, or they may be criss-crossed as illustrated, where one set of parallel ribs intersects another parallel set of ribs at substantially 90°. Where the holes are not in alignment, the ribs may be extended in non-parallel series across the gusset.

The gusset, illustrated in FIGS. 3 through 7, shows the teeth arrangement of a single hole where four teeth or projections 5 are punched from the gusset 1 leaving a square hole 6 per set of four teeth in the plate. Each hole has two pair of opposed teeth set generally at right angles to each other. Each tooth 5 of the set is a generally triangular member which is cut and broken out of the gusset. Each tooth is pushed so that it extends substantially 90° to the general plane of the plate, and all teeth extend in the same direction from the plate. As each tooth is pushed into extending position, a small amount of metal from the inner face 7 of the tooth is pushed toward the point 8 of the tooth forming a hook or binding portion 9. Since the teeth are broken out of the plate, a jagged edge 10 results on each side of the triangular shaped tooth which increases the holding power of each tooth. The jaggedness is exaggerated in FIG. 3 to more clearly show the character of the tooth edges. The profile plane of each tooth is flat, and extends generally 90° from the plane of the plate. Thus a peripheral series of four, flat teeth are provided from each hole, which when pressed into the wood cuts a small core. The core is circumferentially completely severed at the face of the wood adjacent the base of the teeth. At the teeth points, however, the core is almost completely untouched so that the core is integrally joined with the wood. Also, as the teeth are pressed into the wood, the teeth flower out increasing the holding strength of the teeth.

One action of a tooth when imbedded in wood is schematically illustrated in FIG. 4 where a tooth 5 has been pressed into a wood body 15 with lower surface of the plate 16 pressed tightly against the top surface of the wooden member 15. The fibers of the member 15, which are cut when the tooth is forced into the wood, press against both faces of the tooth 5, and the hook 9 tends to prevent the tooth from being withdrawn from the wooden member. As wood is elastic, when the tooth is driven into the wood, the severed fibers are slightly distorted under the pressure of the tooth until they are cut. After the fibers are cut they tend to spring back into original position. This springing back tends to push the severed ends of the fibers tightly against the tooth faces. Thus each tooth is held firmly on the front and back faces by the severed fibers and by the hooking action of the prejection 9 bearing against the severed fibers. When the tooth flares or flowers an additional holding action is achieved.

Each series of the teeth around the square hole may be rotated from alignment with a plane passing through the centers of adjacent openings so that the opposed pairs of teeth in adjacent holes are placed at a different angle. As illustrated in FIGS. 5, 6 and 7, the angle of the teeth of the adjacent series are rotated through different angles. In FIG. 5 the angle $a$ of the opposed pair of teeth to a plane 20 passing through the center of adjacent opening is approximately 90°. In FIG. 6, the teeth are rotated so that the plane of two opposed teeth are at an angle $b$, for example about 45° to a perpendicular to plane 20. Likewise, in FIG. 7 the plane of two opposed teeth are at an angle $c$ to the perpendicular to plane 20 (which is the complimentary angle of the angle to plane 20), which may be 60°, and which is different from the angles $a$ and $b$. Thus by rotating the teeth in adjacent series, the angle of penetration of the teeth of adjacent openings into a wooden member will be different and severance of the wood fibers is assured. Further, the rotation of the plane of the teeth prevents splitting since adjacent teeth will not enter the same wood grain since they are rotated at a slightly different angle. The rotation of the sets of teeth eliminates any directional strength properties of the gusset, in other words it has equal strength in all three hundred and sixty degrees of rotation. The angle at which each series is rotated may be adjusted so that there may be sets of two, three, four, five or six or more series of teeth at different angles. By having four different angles of rotation, that is providing four series of holes at a different angle from each other, it is possible to make a plate where no two adjacent series will be at the same angle. Thus different rows of series may be so positioned that adjacent series in adjacent rows will be at different angles, and the angle at which each tooth penetrates the wood is different from any neighboring series.

In using the gusset of the invention, a framing system or unit may be made with the joining wooden members held together by the gusset. A wall frame or panel, illustrated in FIG. 1, includes a series of upright members or studs 25, generally two by fours for home construction, which provide ends for the wall segment. The end studs are attached to a top plate 26 and a bottom plate 27. A gusset of triangular shape 28 is secured to each corner of the wall section. A few nails 29 are extended through the openings of each gusset into the wood members holding the gusset in place until it can be pressed into the wood with the teeth penetrating the wood of the members. A series of uprights 30 may, likewise, be connected between the upper and lower plates by means of gusset 31 cut in rectangular shape. Where cross bracing is desired, cross members 35, 36, 37 and 38 may be cut so as to abut the uprights 30 and abut in the corner of the upper plate 26 and the upright 25. In this instance, a rectangular gusset 40 having a series of nails 29 therethrough holds the three joining members in a single plane. Likewise, a rectangular plate 40 secures the diagonal or bracing members 35 through 38, inclusively, on the upright stud 30. The ends of the diagonals are cut to abut the uprights or the intersection of the uprights and the plates and a rectangular plate is used to join the various members. Such a wall panel is preferably made of two by four stock and is made to provide a single plane panel, that is all the members lying in a common plane so that sheathing may be attached to form smooth surfaces on both faces of the wall section. The single plane construction permits ready stacking and transportation of the framing members and, also, provides a sturdy frame which may be easily handled and installed in a structure.

The framing structure illustrated in FIG. 1 is a wall panel or segment, which may be secured in place for an outside wall section, an inside wall section, or it may be made removable as a partition. Other types of framing structures may obviously be made utilizing the gusset of the invention. Such framing structures as trusses, panels, and partitions may be prefabricated using the gusset at the joints of such single plane framing structures. Thus rigid prefabricated frames may be prepared which are actually less expensive to manufacture than made in place structures and are stronger and form a stronger structure.

In the normal process of manufacture of framing sections, a jig is provided so that a plurality of more or less identical framing sections may be economically manufactured. With such jigs the various wooden members are pre-cut and the jig holds them in position for final assembly. A gusset of the desired size and shape is placed over the joints and a few nails are extended through teeth openings in the gusset into the wood. These few nails hold the gussets in position prior to their being pressed into the wood. Any type of a press may then be used to press the teeth of the gussets into the wood, which incidentally presses the nails into the wood at the same time. The nails contribute some strength to the joint, but are not necessary to form a rigid high strength joint as explained below. A mechanical, hydraulic or other type of press may be utilized, or a rigid metal plate may be placed over the gusset and a heavy hammer used to force the plate into the wood by striking the upper surface of such a metal plate. In any event the method includes the forcing of the teeth into the wood to shear the fibers of the wood and to force the plate flush on the face of the wood.

In the modified gusset illustrated in FIGS. 8 through 13, inclusive, a thin metal plate 50, which may be coated to prevent corrosion as above, has a plurality of holes 51 punched therein. The metal from each of the holes extends from the plate forming four teeth, in a manner similar to the gusset described in FIG. 2. In the modified gusset, however, the teeth are arcuate in profile, as detailed in FIG. 9. In this case the teeth 53 are torn from the metal of the plate, forming four teeth 53 which are circumferentially extended from the hole. Each tooth is slightly arcuate on the rear face 54 and is flat on a major portion 55 of the front face of the tooth. The sides curve generally inward from the flat portion 55. Each tooth has a hook 56, which is formed in a manner similar to that of hook 9 of FIG. 2. As explained before, the teeth are mounted in pairs substantially on opposite sides of the square, and the base of the teeth extend substantially, completely around the periphery of the hole. The holes may be rotated so that the general profile plane of the teeth of each hole is placed at a different angle to its neighboring holes, as illustrated in FIGS. 10, 11 and 12. In this manner, adjacent holes may have their teeth positioned at a slightly different angular position from any adjacent hole to prevent adjacent teeth from cutting in a wood grain at exactly the same angle as its neighbor. As explained above for the modification of FIG. 2, the peripheral arrangement of the teeth of this modification, also, cuts a small core in the wood. Due to the curvature of the teeth, however, they may bend inwardly instead of flowering, but increasing the holding power of the gusset.

Where it is desirable, a series of small nail holes 52 may be punched through the gusset in the area between the holes so that nails may be driven through them instead of the teeth holes. This provides a gusset in which its metal may be used to grip the nails, as by making the holes 52 slightly smaller than the diameter of the nails. In this case the metal forms a tight friction grip on the nails. Nails may, also, be driven through the teeth holes as explained for the square hole gusset of FIG. 2. Also, where desirable reinforcing ribs may be crimped in the metal as illustrated in FIG. 2. In a preferred form the ratio of area of the holes to the area of steel in the plate is .2046, which permits the use of fifteen holes for about ten square inches of gusset and a total of sixty teeth.

In actual tests the strength of the gussets were compared under several conditions. For the tests, the gussets were attached to each side of a joint between two by four segments and pressure applied so that there is shear force between the two by fours directly on the joint. In each case, the specimens were made so as to have sixty effective teeth on each side of the joint. The following table illustrates the increased holding power of the gussets of the invention:

*Table*

| Test | Max. Load, Lbs. | Max. Load Per Tooth, lbs. |
|---|---|---|
| 1 | 12,750 | 212 |
| 2 | 13,500 | 225 |
| 3 | 16,250 | 271 |
| 4 | 10,545 | 142 |
| 5 | 7,500 | 114 |

The tests numbered above correspond to the following, respectively:

(1) Gusset according to FIG. 2 with six nails per gusset, total gusset area is 19.5 square inches, total number of teeth is 120 in engagement with the wood.

(2) Gussets according to FIG. 8 with no nails, total gusset area is 19.5 square inches, total number of teeth engaging wood is 120.

(3) Gusset according to FIG. 8 with six nails per gusset area is 19.5 square inches, total number of teeth engaging wood is 120. In this test the wood of the two by fours split before any failing or buckling of the gusset.

(4) Gusset with a single tooth punch out and with six nails per gusset, total area of gussets is 18 square inches, total number of teeth engaged in wood is 132.

(5) Gusset same as No. 4 with no nails used to hold the gusset, total area of gussets is 18 square inches and 132 teeth engaged with the wood.

It is readily seen from the table that the gusset of FIG. 8 with the curved teeth, four punched out of a single opening, provides a gusset having a tooth almost twice as strong as the gusset having a single tooth punched from a single opening. Furthermore, the gusset without the use of nails, test 2, is over fifty (50) percent better than the gusset having the single tooth punched from a single opening even with the added nails.

While the invention has been described in relation to particular modification, there is no intent to limit the scope or the spirit of the invention to the precise details so set forth, except as set forth in the following claims.

I claim:

1. A gusset for joining wooden members together comprising a substantially flat metal strip having a plurality of spaced openings therein, said openings being disposed in at least three substantially linear rows, four teeth depending from the perimeter of the strip surrounding each said opening and extending perpendicularly from one side only of said strip, said teeth being disposed about the perimeter of each said opening in opposed pairs to form an enclosure therebetween for biting into a wooden member, said teeth being substantially triangular in shape, with the lower end of the teeth forming the apex of the triangle, and the teeth at one said opening being angularly displaced with respect to the teeth at adjacent openings, whereby the teeth grip a wooden member without splitting it.

2. The gusset of claim 1 in which there are at least three openings in each of the three linear rows.

3. The gusset of claim 1 in which the teeth of a first row are angularly disposed at an acute angle with respect to the teeth of a second row and a third row, and the relative angles between the teeth in the first and the second row, and the teeth in the first and the third row are different.

(References on following page)

References Cited in the file of this patent

UNITED STATES PATENTS

| | | |
|---|---|---|
| 985,501 | Bell | Feb. 28, 1911 |
| 1,015,402 | Romunder | Jan. 23, 1912 |
| 1,089,878 | Steinhauser | Mar. 10, 1914 |
| 1,638,612 | Baus | Aug. 9, 1927 |
| 2,004,182 | Arey | June 11, 1935 |
| 2,231,068 | Harrington | Feb. 11, 1941 |
| 2,639,876 | Misfeldt | May 26, 1953 |
| 2,636,189 | Feldman | Apr. 28, 1953 |
| 2,797,447 | Winer | July 2, 1957 |
| 2,827,676 | Sanford | Mar. 25, 1958 |

FOREIGN PATENTS

| | | |
|---|---|---|
| 63,390 | Germany | July 18, 1892 |
| 676,836 | France | Nov. 29, 1929 |
| 391,257 | Great Britain | Apr. 27, 1933 |
| 495,606 | Great Britain | Nov. 16, 1938 |